Patented Aug. 25, 1931

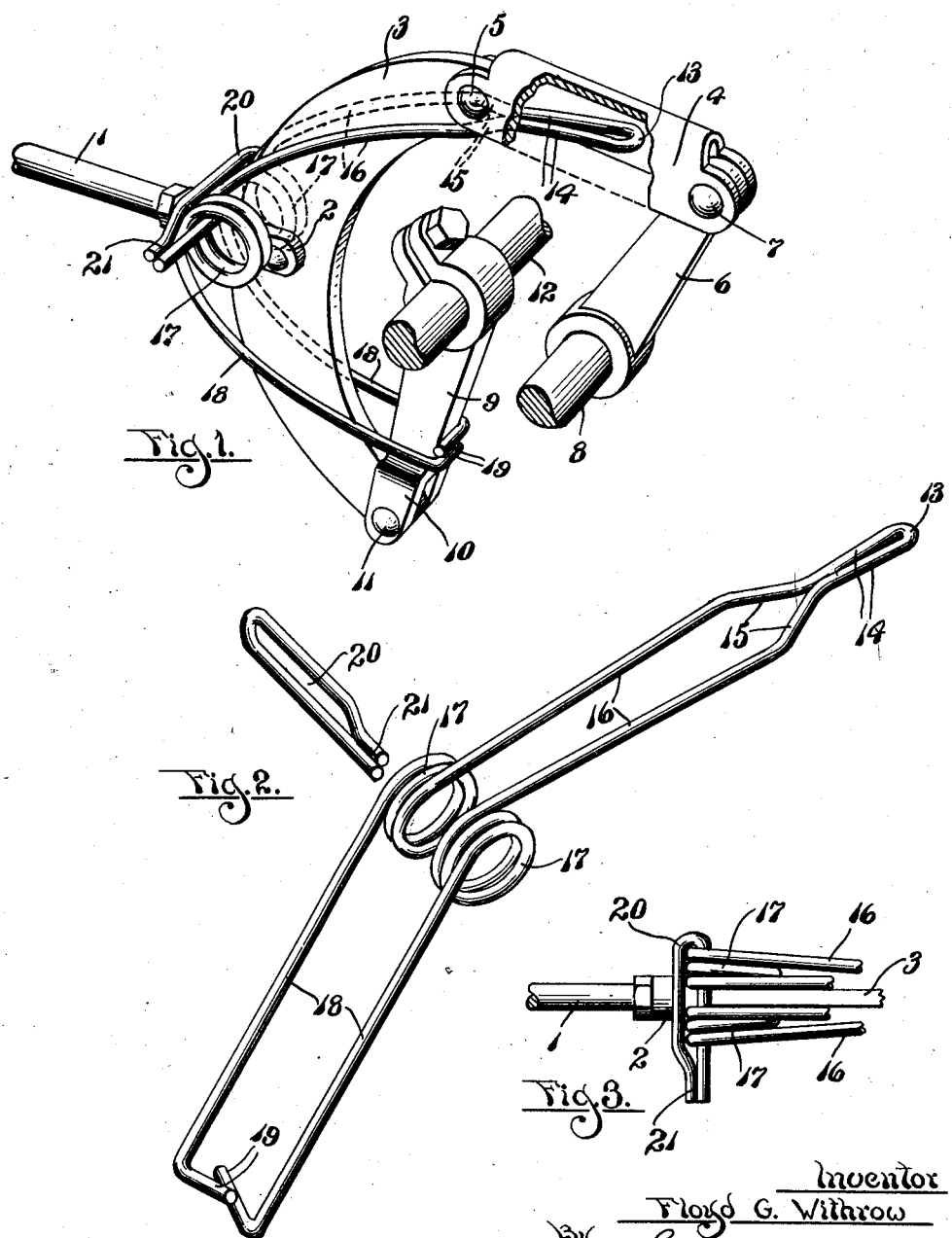

1,820,719

UNITED STATES PATENT OFFICE

FLOYD G. WITHROW, OF GRAND RAPIDS, MICHIGAN

BRAKE RATTLE SILENCER

Application filed October 21, 1929. Serial No. 401,336.

This invention relates to a brake rod rattle silencer particularly adapted for application to a joint construction on an automobile where the connection between the service brake pedal and the rock shafts for operating brake rods, which extend forward and to the rear to the service brakes, is made. This connection includes several pivot joints which are subject to wear and after a time become loosened with consequent rattle when the automobile is driven over the road; and it is a primary object of my invention to provide a simple rattle prevention or silencing device which will eliminate rattling or the possibility thereof in the pivot joints noted.

An understanding of the invention for the attainment of the ends stated may be had from the following description taken in connection with the accompanying drawings, in which, Fig. 1 is a perspective view, with parts in section, illustrating the use of the silencer device of my invention and showing the same applied and in operative connection.

Fig. 2 is a somewhat enlarged perspective view of the silencer device as made in accordance with my invention, and Fig. 3 is a fragmentary plan view of the construction shown in Fig. 1, particularly where the rod leading from the service brake pedal connects with a yoke forming a part of the motor vehicle construction.

Like reference characters refer to like parts in the different figures of the drawings.

In the construction a rod 1 leads rearwardly from the service brake pedal of the automobile and its rear end is connected to a yoke 2, the spaced sides of which pass at the sides of an arc shaped connecting member 3 formed from flat metal and positioned in a vertical plane, the end of the yoke 2 having pivotal connection to said member 3 between its ends. To the upper end of the member 3 a link 4 is pivotally connected at the one end, at 5. The link is formed from sheet metal bent longitudinally into U-shape so that a side thereof passes at each side of member 3 to which it is pivotally connected. An arm 6 at its upper end extends between the sides of the link 4 and is pivotally connected thereto by the pivot pin or rivet 7. The arm is permanently secured at its lower end to a horizontal rock shaft 8 which extends across the frame of the automobile and at its ends is equipped with other arms not shown from which the brake rods extend to the service brakes for the rear wheels of the automobile.

A second arm 9 at its lower end is formed with a fork 10 to embrace the lower end of the arc shaped member 3, being pivotally connected thereto as indicated at 11. The upper end of the arm 9 is fixed on a second rock shaft likewise having at its ends other arms to which rods are connected and extend forward to the service brakes for the front wheels of the automobile.

The construction described contains pivots at 5, 7, and 11 and where the yoke 2 is connected with the member 3. All of these pivot connections are liable to become loose because of wear after a period of service with a consequent production of undesired noises and rattlings when the automobile is driven over the road.

The silencer device, which I have provided to eliminate and silence rattling noises in the construction described, is made from a single length of spring wire which is bent at its middle point, as at 13, into a closed bend, the sections 14 of the wire extending from the bend lying closely adjacent to each other for a short distance. They then diverge outward, as indicated at 15, and then are extended into long sections 16 parallel to each other. At the ends of sections 16 spring coils 17 are coiled outwardly from each other and from the coils other relatively long sections 18 extend, normally at an obtuse angle to the plane of sections 16. Each of the sections 18 terminates in an inturned end 19 which is bent at angles somewhat less than 90° to the length of the respective sections 18.

Applying this device to the brake rod operating mechanism first described, the device is spread apart so that it may pass at each side of the member 3, and the narrow terminal portion consisting of the bend 13 and adjacent sections 14 is inserted into the link 4 at the underside between the opposite sides thereof. The diverging parts 15 permits one of the sections 16 to pass along each side of the upper portion of the member 3. The coils 17 lie adjacent the yoke 2. The sections 18 extend from said coils downwardly and to the rear, one at each side lower part of the member 3 and the ends 19 hook around the rear edge of the arm 9, all as fully shown in Fig. 1.

After the device has been applied in this manner a retaining key 20 formed from a single length of wire bent into U-shape with its free ends 21 bent so as to be closely adjacent to each other is passed through the coils 17 above the yoke 2, thereby holding the device from rearward or downward movement. It is evident that in the application of the device to the brake construction described it is very much sprung out of shape and the tendency thereof to return to normal form causes an exertion of pressure on the link 4 affecting the two pivots joints at 5 and 7 at its ends; also on the yoke 2 affecting its pivot connection with member 3; and also upon arm 9 affecting pivot 11 which connects it with the member 3. This holds such pivot connections in firm engagement and serves to eliminate rattlings and the like which would otherwise occur from looseness of the parts, especially after wear of the parts had made the pivot joints loose.

The construction described is very easily applied and when once in place is insured against disengagement. The invention has proved very practical and satisfactory for the purposes for which it is designed. The claims appended hereto define the invention which is to be considered comprehensive of all forms of construction coming within the scope of said claims.

I claim:

1. A device of the class described, formed from a single length of spring wire bent at its middle to form a close bend for a short distance, thereby providing a narrow terminal portion having wire sections located close together, said sections diverging outwardly, then extending in relatively long sides substantially parallel to each other, said sides being continued in spring coils coiled outwardly away from each other, the coils thence extending in other relatively long side sections spaced apart and parallel to each other and located in a plane at an obtuse angle to said first mentioned relatively long sides and terminating in inturned portions located at an angle of less than 90° to the parts from which they are bent.

2. A device of the class described comprising two coils each having sections of wire extending therefrom at an obtuse angle with respect to each other, said sections being spaced apart and substantially parallel to each other, one of the pairs of wire sections having straight free end portions turned inwardly toward each other and the other of said sections being converged toward each other to form a narrow terminal portion connected by an integral bend.

3. In combination, an arc shaped member located in a vertical plane, a yoke pivotally connected to said member between its ends and extending forward therefrom, a rod connected to and extending forward from the yoke, a link pivotally connected to and extending rearwardly from the upper end of said member, an arm pivotally connected to and extending downwardly from the rear end of said link, a second arm pivotally connected to and extending upwardly from the lower end of said member, said arms at their opposite ends being attached to rock shafts and a spring tension device engaging at one end against the lower side of the link and extending to and engaging said yoke, extending therefrom to the second mentioned arm and having means to detachably connect the same with said second arm, said spring tension device being sprung out of normal form to exert pressure upon all of the pivots of said member, link, yoke, and arms, for the purposes described.

4. A construction containing the elements in combination defined in claim 3, said spring tension device having spring coils adjacent said yoke and a retaining member passing through and engaging with said coils and bearing against the upper side of said yoke and against the front edge of said arc shaped member to maintain the spring tension device in place.

5. A device of the class described formed from a single length of spring wire bent at its middle to form a bend, the wires extending from said bend lying closely together for a short distance and then diverging outwardly being thence extended into two relatively long sections substantially parallel to each other spring coils at the ends of said sections, other long sections extending from the coils at an acute angle to the first elongated sections, said second elongated sections having inturned end portions, and a member formed from a single length of wire bent into U-shape and having free end portions close together, passing through said coils, for the purposes described.

In testimony whereof I affix my signature.

FLOYD G. WITHROW.